United States Patent [19]

Lundberg et al.

[11] Patent Number: 4,526,440
[45] Date of Patent: Jul. 2, 1985

[54] FASTENING DEVICE FOR INTERCHANGEABLE PROJECTION LENS

[75] Inventors: Jan A. Lundberg, Torslanda, Sweden; Rolf G. Fransson, Angered, both of Sweden

[73] Assignee: Victor Hasselblad Aktiebolag, Gothenburg, Sweden

[21] Appl. No.: 495,641

[22] Filed: May 18, 1983

[30] Foreign Application Priority Data

Jun. 15, 1982 [SE] Sweden .............................. 8203709

[51] Int. Cl.³ .............................................. G03B 17/00
[52] U.S. Cl. .......................... 350/257; 285/DIG. 22; 354/286
[58] Field of Search ............... 285/DIG. 22; 350/257, 350/252; 354/286

[56] References Cited

U.S. PATENT DOCUMENTS 2,618,201 11/1952 Brohl et al. ..................... 350/257
3,588,149 6/1971 Demler et al. ............. 285/DIG. 22

Primary Examiner—John K. Corbin
Assistant Examiner—William Propp
Attorney, Agent, or Firm—Sherman & Shalloway

[57] ABSTRACT

The invention relates to a device for detachably attaching a lens tube (2) to a lens barrel (1). It is characterized in that the lens barrel inside its forward free edge (5) is provided with peripheral grooves (3) extending in the same plane, the respective bottom of which at the ends (9) of the groove inclined in said plane transforms into the shell surface of the barrel (1), which shell surface tapers conically (6) to the free edge (5) of the barrel. A guide shoulder (4) tapering in wedge-shape thereto is located on the shell surface between two adjacent grooves (3). The tube (2) is provided with radially resilient hooks (11) capable at mounted tube (2) to engage with the grooves (3) of the barrel (1).

4 Claims, 2 Drawing Figures

FASTENING DEVICE FOR INTERCHANGEABLE PROJECTION LENS

This invention relates especially to slide projectors with interchangeable lenses of the kind where the respective interchangeable lens is mounted permanently in a lens tube, which is detachably attached to the lens barrel of the slide projector.

Known fastening devices with good precision often are expensive to manufacture and are at times complicated to use. Other known devices of a simpler design often suffer from mechanical play rendering it difficult to focus the picture.

In order to eliminate these drawbacks and to provide a fastening device easy to handle and simple to manufacture while maintaining high precision, the present invention includes the characterizing features disclosed herein and defined in the claims.

A projector (not shown) is provided with a lens barrel 1, which is axially reciprocatory for focusing, and the forward portion of which can be detachably coupled together with a lens tube 2 (FIG. 1), in which a lens (not shown) is permanently mounted.

Figure 1:
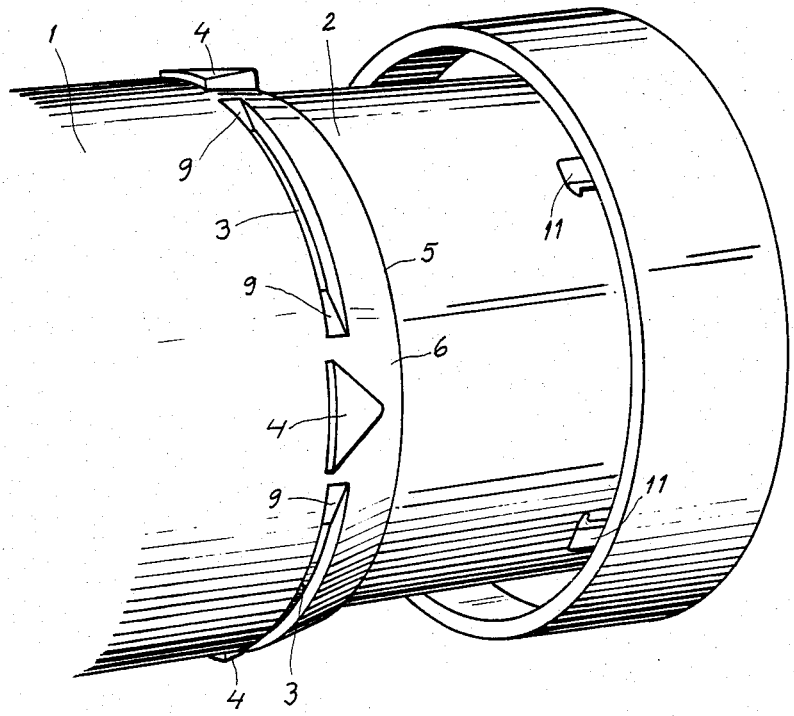
FIG. 1 is a perspective view of an interchangeable lens in the stage of its mounting/dismounting.

In the same plane extending perpendicularly to the axis of the lens barrel 1 peripheral grooves 3 are located, which at the embodiment shown are four in number. The bottom of the respective groove 3 transforms by an inclined surface 9 into the shell surface of the lens barrel 1, as indicated in FIG. 1. The lens barrel 1 tapers conically (6) from the grooves to the forward free edge 5, see especially FIG. 2. Between the grooves 3 triangular guide shoulders 4 project upward out of the shell surface of the lens barrel 1 and with their pointed end facing forward.

The lens tube 2 is mounted in the interior of the lens barrel 1, and its forward portion is designed as a protective ring 10 spaced from the shell surface of the lens tube 2. As shown at this embodiment, hooks 11 integral with the protective ring 10 are directed rearward relative to the lens tube 2 and located inside the protective ring 10. The hooks 11 are designed so as to be resilient radially but preferably rigid in peripheral direction.

Figure 2:
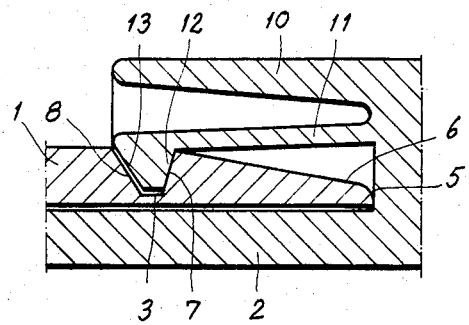
FIG. 2 is a detail cross-sectional view of the locking member of the device shown by way of a longitudinal section.

As appears clearly from FIG. 2, the hooks 11 snap down into the grooves 3 when the lens tube 2 is inserted into the lens barrel 1 and its forward edge 5 bottoms the protective ring 10. By designing the sides 13 of the hooks inclined at a suitable angle, see FIG. 2, they are easily guided upward on the conic surface 6. By designing the side 7 of the groove 3 and the side 12 of the hook 11 sufficiently steeply, the respective hook 11 can be made self-braking and be prevented from being axially drawn out of the groove 3. In order to prevent play from arising between the lens barrel 1 and lens tube 2, the distance between the forward edge 5 and the groove side 7 of the lens barrel 1 can preferably be given a length slightly exceeding the distance between the bottom of the protective ring and the side 12 of the hook 11. By simultaneously designing the groove side 7 and the hook side 12 slightly inclined, the hook snaps down into the groove 3 in spite of said difference in length and by its spring action all the time tends to draw the lens tube 2 into the lens barrel 1.

For dismounting the lens tube 2. the tube is turned in an optional direction, whereby the hooks 11 after having arrived at one end of the hook grooves 3 are pressed upward by the end surfaces 9. Upon continued turning, the sides of the hooks 11 meet the inclined sides of the guide shoulders 4 which force the lens tube forward, whereby the coupling between the lens barrel 1 and lens tube 2 is suspended simply and rapidly.

At the embodiment shown, the hooks 11 and protective ring 10 are designed integrally with the lens tube 2, and the resilience of the hooks is obtained by the choice of a suitable material.

What we claim is:

1. A device for detachably attaching a lens tube on a lens barrel, having an outer surface comprising: said lens barrel having a forward free edge and said outer surface adjacent said free edge having at least two peripheral grooves located in the same plane, each of said grooves having a bottom having ends which are inclined in said plane to the outer surface of the barrel, said barrel outer surface tapering substantially conically from said grooves to the free edge of the barrel, said barrel further including a guide shoulder on said outer surface tapering wedge-shaped toward said free edge between two adjacent said grooves, and the tube being provided with radially resilient hooks capable of engaging with the grooves of the barrel when said tube is mounted on said barrel, respective guide shoulders interacting with respective hooks to axially outwardly move said tube with respect to said barrel, upon rotation of said tube with respect to said barrel.

2. A device as defined in claim 1, further wherein the distance between the free edge of the barrel and a side of a respective groove facing thereto is slightly greater than the distance between a stop member on said tube and a respective hook thereby limiting the insertion distance of the tube in the barrel and of a side of a respective hook facing to said stop member, which hook side is slightly inclined, seen in the direction radially inward from the stop member.

3. A device as defined in claim 2, further wherein that the tube radially outside the hooks is provided with a protective ring, which is attached to the tube by means of a flange constituting the stop member.

4. A device as defined in any one of claims 1–2, further wherein the sides of the hooks and the sides of the grooves co-operating with said hook sides have an inclination so chosen that they form a self-braking friction connection with each other upon axial loading of the hooks.

* * * * *